US011912023B2

(12) United States Patent
Yu et al.

(10) Patent No.: US 11,912,023 B2
(45) Date of Patent: Feb. 27, 2024

(54) INKJET PRINTER INCLUDING INK TEMPERATURE CONTROL UNIT

(71) Applicant: GOSANTECH CO., LTD., Cheonan-si (KR)

(72) Inventors: Jaeryul Yu, Cheonan-si (KR); Dongkyun Shin, Sejong-si (KR)

(73) Assignee: GOSANTECH CO., LTD., Cheonan-si (KR)

(*) Notice: Subject to any disclaimer, the term of this patent is extended or adjusted under 35 U.S.C. 154(b) by 168 days.

(21) Appl. No.: 17/737,315

(22) Filed: May 5, 2022

(65) Prior Publication Data

US 2023/0001689 A1 Jan. 5, 2023

(30) Foreign Application Priority Data

Jul. 5, 2021 (KR) ........................ 10-2021-0087575

(51) Int. Cl.
*B41J 2/045* (2006.01)

(52) U.S. Cl.
CPC ....... *B41J 2/04563* (2013.01); *B41J 2/04586* (2013.01)

(58) Field of Classification Search
CPC .... B41J 2/04563; B41J 2/04586; B41J 2/195; B41J 2/18; B41J 2/17503; B41J 2/14; B41J 2/072; B41J 29/393
See application file for complete search history.

(56) References Cited

U.S. PATENT DOCUMENTS

2003/0133492 A1* 7/2003 Watanabe ............ B41J 2/04541 374/179

FOREIGN PATENT DOCUMENTS

| | | | |
|---|---|---|---|
| JP | 2-162054 | A | 6/1990 |
| JP | 2018-158523 | A | 10/2018 |
| KR | 10-0492115 | B1 | 6/2005 |
| KR | 10-1083777 | B1 | 11/2011 |
| KR | 10-1661667 | B1 | 9/2016 |
| KR | 10-1963717 | B1 | 3/2019 |

OTHER PUBLICATIONS

Korean Notice of Allowance dated Jul. 18, 2023 in Application No. 10-2021-0087575.

* cited by examiner

*Primary Examiner* — Justin Seo
*Assistant Examiner* — Tracey M McMillion
(74) *Attorney, Agent, or Firm* — Sughrue Mion, PLLC

(57) ABSTRACT

An inkjet printer configured to control the temperature of ink discharged from nozzles of an inkjet head is proposed. The inkjet printer includes: an inkjet head including a plurality of nozzles configured to discharge ink, an ink reservoir configured to store ink supplied to the inkjet head, a supply channel configured to supply the ink in the ink reservoir to the inkjet head, a pressure control device connected to the ink reservoir through a pressure control tube and configured to maintain the meniscus of the ink injected into the inkjet head, and the ink temperature control unit configured to control temperature of the ink discharged from the inkjet head.

10 Claims, 10 Drawing Sheets

INKJET PRINTER INCLUDING INK TEMPERATURE CONTROL UNIT

CROSS REFERENCE TO RELATED APPLICATION

The present application claims priority to Korean Patent Application No. 10-2021-0087575, filed Jul. 5, 2021, the entire contents of which is incorporated herein for all purposes by this reference.

BACKGROUND OF THE INVENTION

Field of the Invention

The present disclosure relates generally to an inkjet printer configured to control the temperature of ink and, more particularly, to an inkjet printer configured to control the temperature of ink discharged from nozzles of an inkjet head.

Description of the Related Art

In general, inkjet printing is a method of spraying liquid ink in the form of droplets on a surface of a medium according to a shape signal. Inkjet printing is applied not only in a field of document printing in which ink is placed on paper, such as documents or flyers, but also in a process of manufacturing various articles. Specifically, the inkjet printing method is applied to a manufacturing process that requires a solution process for positioning a solution at a specific location.

In particular, the application of inkjet printing is increased in a semiconductor or display field where a complex shape pattern is formed on a substrate or ink must be precisely discharged only at a specific location.

The inkjet printing is performed to spray ink in the form of droplets through nozzles, and when the number of nozzles included in an inkjet head where printing is performed is large, the solution process can be performed over a wide range at once. The conventional inkjet printer developed for a purpose of printing documents has a limited number of the nozzles and the amount of ink used is not large according to the purpose. Therefore, the conventional inkjet printer has a form of storing ink in the inkjet head discharging ink droplets.

However, a large-sized document printer that continuously prints a large amount of documents or an industrial inkjet printer for performing the solution process has relatively more nozzles and uses a large amount of ink. Accordingly, a structure for storing ink in an ink reservoir provided separately from the inkjet head is applied to the inkjet printer.

Meanwhile, it is important to discharge a correct amount of ink in the form of droplets at a correct location for the inkjet printer, and the discharge on a correct location is an important feature in the industrial inkjet printer and is treated as particularly important feature in the semiconductor and display field, where increasingly precise parts are required.

In order to discharge the correct amount of ink during the inkjet printing process, the ink in a ready state for discharge from the inkjet head should maintain the meniscus, which is a curved surface state in which the ink is concave inward by the capillary with respect to a nozzles inlet. For the meniscus, the ink reservoir is located higher than that of the inkjet head, but negative pressure is generated inside the ink reservoir, thereby preventing the ink from flowing from the inkjet head and maintaining the meniscus. However, due to a difference in viscosity of ink, it is insufficient to maintain the meniscus by simply generating the negative pressure inside the ink reservoir.

Specifically, the process of discharging ink in the form of droplets is affected by surface tension and viscosity of ink. The viscosity is related to how easily the ink flows through a head channel and is squeezed out of the nozzles, and the surface tension is related to how optimally the ink can form round droplets, so the viscosity and the surface tension are important in the inkjet printing. Ohnesorge number (Oh) is a dimensionless number that relates the viscosity to inertia and the surface tension as defined by Wolfgang von Ohnesorge, and is used by defining a constant Z, which determines a discharge property of ink, in the form of 1/Oh.

$$Oh = \frac{\mu}{\sqrt{\rho\sigma L}}$$

μ is dynamic viscosity of liquid, ρ is density of the liquid, σ is the surface tension, and L is a characteristic length measure (typically, a diameter of a droplet). A window in which inkjet printing can be performed may be derived by reflecting the characteristics of the liquid as described above and a falling speed.

FIG. 8 is a diagram showing obtaining a liquid window applied to the inkjet printing by using Oh.

In response to the characteristics of the liquid as described above and the falling speed, a position of a red circle is determined, and a window indicated in green in the drawing is the window that can be applied in the inkjet printing. When the position deviates from the green region, printing is not possible due to being too viscous or satellite droplets are formed with the droplets, resulting in poor quality.

Therefore, it is desirable to consider Oh in the process of composing ink, but since ink of the industrial inkjet printer is mainly composed for the purpose of manufacturing, the position may deviate from the range shown in FIG. 8. In order to solve the above problems, a technology for controlling the viscosity of ink by heating the ink has been developed.

FIG. 9 is a view showing the configuration of a temperature control device of a head of a conventional inkjet printer.

Korean Patent No. 10-0492115 proposed the technology related to the head temperature control device configured to discharge ink within a proper temperature range from an inkjet head 100 by using a heating element 500 and a cooling element 600.

In Korean Patent No. 10-0492115, the heating element 500 heating the inkjet head 100 and the cooling element 600 provided at one portion of the inkjet head 100 separately from nozzles are provided respectively, thereby individually driving the elements, so that accurate temperature control is difficult and energy consumption is high.

FIG. 10 is a view showing the configuration of a temperature control device configured to control the temperature of ink by using a thermo element.

Korean Patent No. 10-1083777 disclosed the technology related to the temperature control device that is configured to heat or cool ink with a thermo element 700 installed at the ink reservoir 200 provided in the inkjet head 100 including a plurality of nozzles.

In Korean Patent No. 10-1083777, the thermo element 700 is used to precisely adjust the temperature to a predetermined temperature, but due to the nature of the thermo element that can control only an adjacent part, it is difficult to control the temperature over a wide range. Therefore, it is difficult to control the temperature of the nozzles or the head from which ink is discharged, and it is only possible to control the temperature of the ink stored in the ink reservoir 200.

Herein, in a structure where the ink reservoir and the inkjet head are separated from each other, as the temperature of the ink is changed while the ink is moved from the ink reservoir to the inkjet head, the ink temperature in the discharge stage is different from the ink temperature adjusted in the ink reservoir.

Therefore, Korean Patent No. 10z-1083777 has a structural limitation that the temperature control device may be applied only to a structure in which the ink reservoir 200 is installed at an upper portion of the inkjet head 100 including the nozzles, but not to the industrial inkjet printing in which the ink reservoir and the inkjet head are separated from each other.

DOCUMENTS OF RELATED ART (Patent Document 1) Korean Patent No. 10-0492115

(Patent Document 2) Korean Patent No. 10-1083777

SUMMARY OF THE INVENTION

Accordingly, the present disclosure has been made keeping in mind the above problem occurring in the related art, and the present disclosure is intended to propose an inkjet printer configured to quickly and precisely adjust the temperature of discharged ink.

In order to achieve the above objective, according to one aspect of the present disclosure, there is provided an inkjet printer including an ink temperature control unit, the inkjet printer including: an inkjet head including a plurality of nozzles configured to discharge ink; an ink reservoir configured to store ink supplied to the inkjet head; a supply channel configured to supply the ink in the ink reservoir to the inkjet head; a pressure control device connected to the ink reservoir through a pressure control tube and configured to maintain meniscus of the ink injected into the inkjet head; and the ink temperature control unit configured to control temperature of the ink discharged from the inkjet head, wherein the ink temperature control unit may include a vortex tube configured to be supplied with compressed air and discharge a low-temperature air current and a high-temperature air current, a mixing part configured to mix the low-temperature air current and the high-temperature air current that may be discharged from the vortex tube and to generate a heat transfer medium, a controller configured to adjust a ratio of the low-temperature air current to the high-temperature air current that may be mixed in the mixing part and to control temperature of the heat transfer medium, and a heat transfer medium supply line configured to supply the heat transfer medium generated in the mixing part to the inkjet head, and the heat transfer medium supplied to the inkjet head through the heat transfer medium supply line may be configured to change the temperature of the ink discharged from the inkjet head by a heat exchange structure.

The inkjet printer may include a low-temperature air current adjustment part configured to adjust flowing amount of the low-temperature air current discharged from the vortex tube into the mixing part, and a high-temperature air current adjustment part configured to adjust flowing amount of the high-temperature air current discharged from the vortex tube into the mixing part, wherein the controller may be configured to control both the low-temperature air current adjustment part and the high-temperature air current adjustment part to adjust the temperature of the heat transfer medium.

The low-temperature air current adjustment part may be a three way valve that may be installed at a low-temperature air current line through which the low-temperature air current may flow and be connected to a low-temperature air current discharge line, the high-temperature air current adjustment part may be a three way valve installed at a high-temperature air current line through which the high-temperature air current may flow and be connected to a high-temperature air current discharge line, and the controller may be configured to adjust opening amount of the three way valve to adjust amount of the low-temperature air current flowing into the mixing part and amount of the high-temperature air current flowing into the mixing part.

The mixing part may include a temperature sensor configured to measure the temperature of the heat transfer medium, and based on the temperature measured by the temperature sensor installed at the mixing part, the controller may be configured to control the low-temperature air current adjustment part and the high-temperature air current adjustment part.

A temperature sensor may be provided at the inkjet head to measure temperature, and the controller may be configured to control the temperature of the heat transfer medium based on the temperature measure by the temperature sensor provided at the inkjet head.

The inkjet head may include a head block in which the nozzles are provided, and the heat transfer medium may flow through a tube provided in the head block, so that heat exchange may be performed.

The inkjet printer may include a heat transfer medium supply line configured to supply the heat transfer medium generated in the mixing part to the ink reservoir, wherein the heat transfer medium supplied to the ink reservoir through the heat transfer medium supply line may be configured to change the temperature of the ink stored in the ink reservoir by a heat exchange structure.

The inkjet printer may include a heat transfer medium supply line configured to supply the heat transfer medium generated in the mixing part to the supply channel, wherein the heat transfer medium supplied to the supply channel through the heat transfer medium supply line may be configured to change the temperature of ink passing through the supply channel by a heat exchange structure.

The inkjet printer may include a heat transfer medium discharge line configured to discharge the heat transfer medium supplied to the heat exchange structure of the inkjet head, wherein the heat transfer medium discharge line may be extended to pass through a heat exchange structure for the supply channel, so that the heat transfer medium passing through the heat transfer medium discharge line may exchange heat with ink passing through the supply channel.

The inkjet printer may include a heat transfer medium discharge line configured to discharge the heat transfer medium supplied to the heat exchange structure of the inkjet head.

The heat transfer medium discharge line may be extended to pass through a heat exchange structure for the ink reservoir, so that the heat transfer medium passing through the heat transfer medium discharge line may exchange heat with the ink stored in the ink reservoir.

According to the present disclosure configured as described above, the inkjet head, i.e., temperature-controlled object, and the temperature of discharged ink are controlled by using the heat transfer medium in the gas form with controlled temperature. Therefore, the inkjet printer of the present disclosure has effects that temperature control is easily performed and energy consumption in the temperature control process is significantly reduced in comparison to the related art in which a heating element and a cooling element are separately provided in the inkjet head to control the temperature.

Furthermore, according to the present disclosure, the present disclosure has an advantage of easily performing the temperature control for the entire inkjet head through a tube in which the heat transfer medium flows in comparison to the related art with a thermo element that may control the temperature only for an adjacent part.

Moreover, the inkjet printer of the present disclosure can heat and cool ink at the same time by using the vortex tube generating the low-temperature air current and the high-temperature air current at the same time, and can maintain the temperature-controlled object at a constant temperature by using the heat transfer medium of a gas form.

The supply line is added to the inkjet printer of the present disclosure using the heat transfer medium of the gas form, so that the inkjet printer of the present disclosure can control the temperature of various positions and can heat or cool ink before being supplied to the inkjet head in advance.

Furthermore, the discharge line is extended as the inkjet printer of the present disclosure uses the heat transfer medium of the gas form, so that the temperature of various positions in the inkjet printer can be controlled and ink before being supplied to the inkjet head can be heated or cooled in advance.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
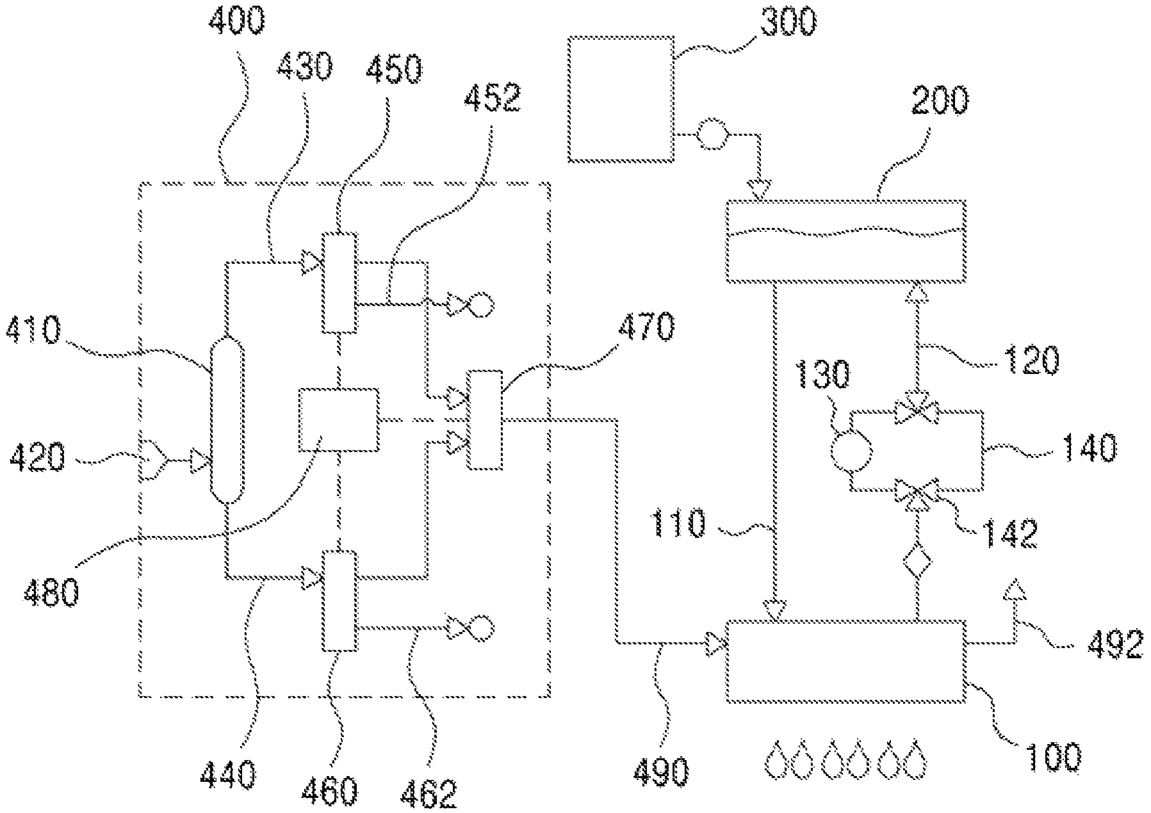
FIG. 1 is a schematic diagram showing the configuration of an inkjet printer according to a first embodiment of the present disclosure.

Hereinbelow, exemplary embodiments of the present disclosure will be described in detail with reference to the accompanying drawings However, it should be understood that the embodiment of the present disclosure may be changed to a variety of embodiments and the scope and spirit of the present disclosure are not limited to the embodiment described hereinbelow. The shape and size of the elements shown in the drawings may be exaggeratedly drawn to provide an easily understood description of the structure of the present disclosure. The same reference numerals will be used throughout the drawings and the description to refer to the same or like elements or parts.

It will be understood that when an element is referred to as being "coupled" or "connected" to another element, it can be directly coupled or connected to the other element or be electrically coupled or connected with element intervening therebetween. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, it will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

FIG. 1 is a schematic diagram showing the configuration of an inkjet printer according to a first embodiment of the present disclosure.

As shown in the drawing, the inkjet printer of the embodiment includes an inkjet head 100, an ink reservoir 200, a pressure control unit 300, and an ink temperature control unit 400.

The inkjet head 100 is a part including a plurality of nozzles discharging ink. The inkjet printer of the embodiment is configured as industrial use and includes the inkjet head 100 and the ink reservoir 200 separated from each other. Excluding the case in which the inkjet head 100 and the ink reservoir 200 are separated from each other, a technical configuration of the inkjet head used in the conventional inkjet printer within the scope that does not impair the characteristics of the present disclosure.

The ink reservoir 200 is a part storing ink in the inkjet printer to supply the ink to the inkjet head 100, and is connected to the pressure control unit 300 maintaining a meniscus. The convention ink reservoir 200 may be applied without limitation within the scope that does not impair the characteristics of the present disclosure.

Meanwhile, the inkjet printer of the present disclosure is not limited in the connection structure for supplying ink between the inkjet head 100 and the ink reservoir 200. However, the embodiment has the configuration of circulating ink between the inkjet head 100 and the ink reservoir 200 in the inkjet printer, so that ink is supplied to the inkjet head 100 while maintaining the dispersibility and homogeneity of the ink.

As the use of the inkjet printer is increasing in industrial fields such as manufacturing and the fields of application of the inkjet printer such as the manufacture of semiconductors and display products are recently diversifying, the case of using ink in which particles are dispersed, such as applying ink in which metal particles are dispersed for electrode patterns is increasing.

In particular, in the field of OLED display, inkjet printing has been attempted for the purpose of applying quantum dot materials only to a predetermined pattern or predetermined position while using the quantum dot materials. However, the dispersibility may be lowered, such as metal particles or quantum dot materials stored in the ink reservoir sink by their own weight. In the structure supplying ink in one direction from the ink reservoir 200 to the inkjet head 100, the dispersibility of the ink is lowered as the amount of time the ink stays is increased. Therefore, ink is initially discharged in a state in which a relatively large number of particles are included in a droplet, and as time passes, the particles included in the droplet are decreased, so that the quality of inkjet printing may be lowered.

In order to solve the problems, the inkjet printer of the present disclosure is configured to have a circulation structure having a supply channel 110 supplying ink from the ink reservoir 200 to the inkjet head 100 and a recovery channel 120 recovering ink remaining in the inkjet head 100 to the ink reservoir 200.

The inkjet printer of the present disclosure is configured to move ink to prevent the ink from stagnating by the supply channel 110 and the recovery channel 120, so that the dispersibility of ink can be maintained. A circulation pump 130 may be installed to circulate ink. In the embodiment of the present disclosure, the circulation pump 130 is installed to the recovery channel 120, but the present disclosure is not limited thereto and the circulation pump 130 may be installed at the supply channel 110.

The supply channel 110, the recovery channel 120, and the circulation pump 130 may be applied with various structures within the scope that does not impair the characteristics of the present disclosure. Specifically, since it is important to maintain the meniscus in the inkjet head 100, various methods may be applied to prevent the meniscus in the inkjet head from being broken due to pulsation of ink generated in the circulation process of ink.

Furthermore, a bypass channel 140 that does not pass through the circulation pump 130 is provided, and a path in which the circulation pump 130 is installed and the bypass channel 140 may be configured to be selectively opened in response to the operation of a direction change valve 142.

The bypass channel 140 is a path through which ink may flow without passing through the circulation pump 130. The direction change valve 142 may allow ink to be moved one of the path with the circulation pump 130 or the bypass channel 140.

The circulation pump includes a check valve to prevent flowing backward, and is applied as an element that interferes with filling in an initial filling process. In order to precisely perform inkjet printing, the inkjet head 100, the supply channel 110, and the recovery channel 120 should be full with ink, and when ink is injected for the first time when using the inkjet printer for the first time or all ink is removed from the parts for maintenance and then new ink is injected newly for reoperation, gravitational spontaneous filling is performed. As the gravitational spontaneous filling is performed, generation of bubbles generated in the inkjet head 100 and the paths is reduced and the generated bubbles may be removed while being moved without stagnating. Herein, the check valve of the circulation pump has a problem of interfering with the spontaneous filling.

In the embodiment, the bypass channel 140 is separately provided, so that ink may be moved without passing through the circulation pump 130 when the gravitational spontaneous filling is performed. Moreover, as the bypass channel 140 is provided, when the circulation pump 130 is repaired or replaced, ink in the inkjet head 100, the supply channel 110, and a supply reservoir 200 for the inkjet head does not need to be removed.

As described above, in the embodiment shown in the drawing, since the circulation pump 130 is installed at the recovery channel 120, the bypass channel 140 is also installed at the recovery channel 120, but the present disclosure is not limited to the embodiment. When the circulation pump 130 is installed at the supply channel 110, the bypass channel 140 is also installed at the supply channel 110.

The pressure control unit 300 controls the ink in the inkjet head 100 to maintain the meniscus thereof by controlling pressure of the ink reservoir 200. The pressure control unit 300 may be applied without limitation within the scope that does not impair the characteristics of the present disclosure. Specifically, since the pressure control unit 300 is applied with a general structure in which the control unit 300 is separately connected to the ink reservoir 200, conventional pressure control units used to maintain the meniscus in the inkjet printer may be applied without modification.

The ink temperature control unit 400 is a part adjusting the temperature of ink discharged from the inkjet head 100 so that the ink has a physical property suitable for the inkjet printing.

Specifically, the ink temperature control unit 400 of the embodiment of the present disclosure adjusts the temperature of the discharged ink by a gas heat transfer medium with temperature adjusted by a vortex tube 410.

The vortex tube 410 is a device configured to separately discharge the high-temperature air current and the low-temperature air current by rotating high pressure air tangentially blowing into a narrow tube at high speed. When compressed air is provided, without separate electricity or material supply, the vortex tube 410 separates cooled air and heated air from each other and discharges the cooled air and the heated air to separate lines, respectively.

The vortex tube 410 may be configured to variously adjust temperatures of the discharged high-temperature air current and low-temperature air current in response to the structure of the vortex tube and pressure and temperature of the injected air. The inkjet printer of the present disclosure uses the high-temperature air current and the low-temperature air current by mixing the air currents together, and in the mixing process, adjusts the ratio of the high-temperature air current to the low-temperature air current, so that the size of the vortex tube is not particularly limited.

According to the embodiment, in addition to the vortex tube 410 as described above, the ink temperature control unit 400 includes a compressed air supply part 420, a low-temperature air current line 430, a high-temperature air current line 440, a low-temperature air current adjustment part 450, a high-temperature air current adjustment part 460, a mixing part 470, a controller 480, and a heat transfer medium supply line 490.

The compressed air supply part 420 is a part supplying compressed air to the vortex tube 410, and may be a compressed air storage to store compressed air and an air compressor suctioning air to generate compressed air. A compressed degree and a compressed speed of the compressed air supplied from the compressed air supply part 420 may be variously adjusted in response to the size of the vortex tube 410.

The low-temperature air current line 430 is a line along which air cooled in the vortex tube 410 is discharged and is connected to the mixing part 470 in which the low-temperature air current and the high-temperature air current are mixed to each other.

The low-temperature air current adjustment part 450 is installed at the low-temperature air current line 430 and adjusts the amount of the cooled air, which is moved into the low-temperature air current line 430, flowing into the mixing part 470. For example, the three way valve is applied to such that one direction thereof is connected to a low-temperature air current discharge line 452 discharging the low-temperature air current to the outside space, so that as the opening degree of the valve is adjusted, the amount of the low-temperature air current flowing into the mixing part 470 can be adjusted.

The high-temperature air current line 440 is a line discharging air heated in the vortex tube 410, and is connected to the mixing part 470 in which the low-temperature air current and the high-temperature air current are mixed to each other.

The high-temperature air current adjustment part 460 is installed at the high-temperature air current line 440 and adjusts the amount of the heated air, which flows toward the high-temperature air current line 440, introduced into the mixing part 470. For example, the three way valve is applied such that one direction thereof is connected to the high-temperature air current discharge line (462) discharging the high-temperature air current to the outside space, so that as the opening degree of the valve is adjusted, the amount of the high-temperature air current flowing into the mixing part 470 can be adjusted.

The mixing part 470 is a part in which the low-temperature air current passing through the low-temperature air current line 430 and the high-temperature air current passing through the high-temperature air current line 440 may be mixed to each other. The heat transfer medium generated by being mixed in the mixing part 470 is gas, and the temperature of the heat transfer medium generated in the mixing part 470 can be adjusted by a mixed ratio of the air currents adjusted while passing through the low-temperature air current adjustment part 450 and the high-temperature air current adjustment part 460.

The controller 480 is a device controlling the low-temperature air current adjustment part 450 and the high-temperature air current adjustment part 460 so as to adjust the temperature of the heat transfer medium generated in the mixing part 470. As described above, when the three way valve is applied to both the low-temperature air current adjustment part 450 and the high-temperature air current adjustment part 460 and the opening degree of the valve is adjusted, the amount of the low-temperature air current and the amount of the high-temperature air current that are injected into the mixing part 470 can be adjusted. When PID control is applied rather than on/off control, the amount of the low-temperature air current and the amount of the high-temperature air current injected into the mixing part 470 can be precisely adjusted. Herein, the controller 480 is preferably operated on the basis of the temperature measured by the temperature sensor installed at the mixing part 470.

The heat transfer medium supply line 490 is a gas line provided to supply the heat transfer medium of a gas form generated by mixing the low-temperature air current and the high-temperature air current in the mixing part 470 to a temperature control object. According to the present disclosure, a final object with the temperature controlled by the heat transfer medium is ink discharged from the nozzles. However, it is difficult to directly control the temperature of the discharged ink, so that the embodiment supplies the heat transfer medium to the inkjet head 100 including the nozzles and storing ink before discharged as a temperature control object.

The configuration provided to control the temperature of ink by the heat transfer medium supplied to the inkjet head 100 may be provided in the inkjet head 100. Various structures that may perform heat exchange between the inkjet head 100, the nozzles included in the inkjet head 100, and ink and the heat transfer medium may be applied without limitations. For example, a head block fixing the nozzles or covering around the nozzles is applied to the inkjet head and a tube through which the heat transfer medium flows may be provided inside the head block. Herein, the tube through which the heat transfer medium flows is preferably located adjacent to the nozzles, and a difference in the heat exchange efficiency may be generated in response to the length of the tube.

The inkjet head 100 may include a heat transfer medium discharge line 492 discharging the supplied heat transfer medium. Furthermore, a sensor is provided to measure the temperature of the inkjet head 100, the nozzles, or ink, and the temperature of the heat transfer medium mixed in the mixing part 470 may be controlled on the basis of the measured temperature.

According to the embodiment, the inkjet head 100, i.e., temperature-controlled object, and the temperature of discharged ink are controlled by using the heat transfer medium in the gas form with controlled temperature. Therefore, the inkjet printer of the present disclosure has effects that temperature control is easily performed and energy consumption in the temperature control process is significantly reduced in comparison to the related art in which a heating element and a cooling element are separately provided in the inkjet head to control the temperature. Furthermore, compared to the related art with a thermo element that may control the temperature only for an adjacent part, the present disclosure has an advantage of easily performing the temperature control for the entire inkjet head through a tube in which the heat transfer medium flows.

Furthermore, as the vortex tube generating both the low-temperature air current and the high-temperature air current is applied, heating and cooling of ink are performed at the same time. As the heat transfer medium of the gas form is used, it is possible to maintain the temperature-controlled object at a constant temperature.

Figure 2:
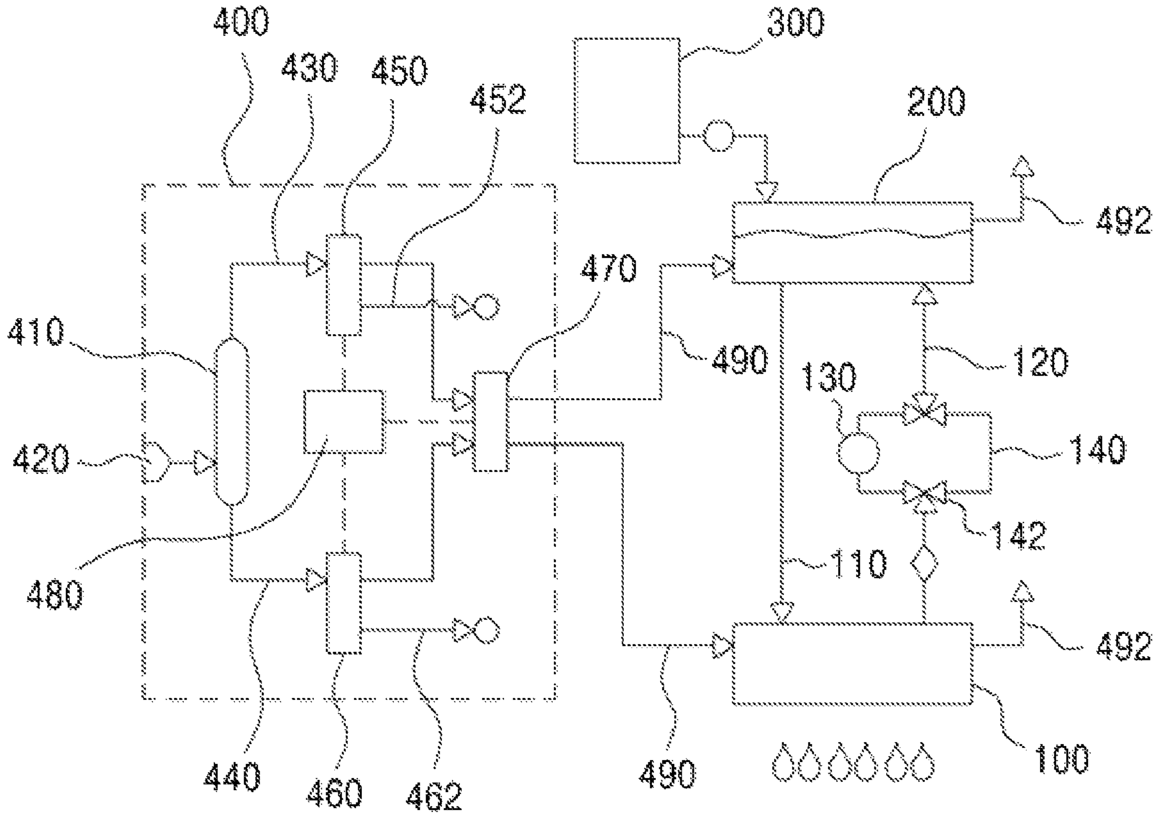
FIG. 2 is a schematic diagram showing the configuration of the inkjet printer according to a second embodiment of the present disclosure.

FIG. 2 is a schematic diagram showing the configuration of the inkjet printer according to a second embodiment of the present disclosure.

As shown in the drawing, the inkjet printer of the embodiment includes the inkjet head 100, the ink reservoir 200, the pressure control unit 300, and the ink temperature control unit 400, and descriptions equal to the first embodiment described above will be omitted.

The heat transfer medium supply line 490 is a gas line provided to supply the heat transfer medium of a gas form generated by mixing the low-temperature air current and the high-temperature air current in the mixing part 470 to a temperature control object. In the present disclosure, a final object with temperature controlled by the heat transfer medium is ink discharged from the nozzles. However, since it is difficult to directly control the temperature of the discharged ink, the inkjet printer of the embodiment supplies the heat transfer medium with the inkjet head 100 including the nozzles in which ink before discharging is located as the temperature-controlled object, and additionally, the inkjet printer supplies the heat transfer medium with the ink reservoir 200 as the temperature-controlled object.

When a difference between the temperature of ink stored in the ink reservoir 200 and a control target temperature is large, as described in the first embodiment, it may be difficult to control the temperature of ink only by supplying the heat transfer medium only to the inkjet head 100. In the embodiment, the inkjet printer is configured to supply the heat transfer medium to the ink reservoir 200 to control the temperature of ink stored in the ink reservoir 200 in advance. In this case, the temperature of ink is easily controlled in comparison to supplying the heat transfer medium only to the inkjet head 100.

The configuration in which the heat transfer medium supplied to the ink reservoir 200 controls the temperature of ink may be provided in the ink reservoir 200. Various structures that may perform heat exchange between the ink reservoir 200 and ink stored therein and the heat transfer medium may be applied without limitations. For example, a tube through which the heat transfer medium flows may be provided in walls constituting the ink reservoir 200 or the periphery area of the ink reservoir 200, and the efficiency of heat exchange may differ in response to the length of the tube.

The ink reservoir 200 may include a heat transfer medium discharge line 492 discharging the supplied heat transfer medium. Furthermore, a sensor is provided to measure the temperature of the ink reservoir 200, or ink stored therein, and the temperature of the heat transfer medium mixed in the mixing part 470 may be controlled on the basis of the measured temperature.

According to the embodiment, by using the heat transfer medium of the gas form with controlled temperature, the inkjet printer is configured to control the temperature of the ink reservoir 200 in addition to the inkjet head 100, i.e., a temperature-controlled object, so that the temperature control of ink is precisely performed and a problem that ink is discharged before the temperature thereof is sufficiently controlled may be prevented.

As the inkjet printer of the present disclosure use the heat transfer medium of the gas form, a supply line is added and thus the temperature in various positions may be controlled.

Figure 3:
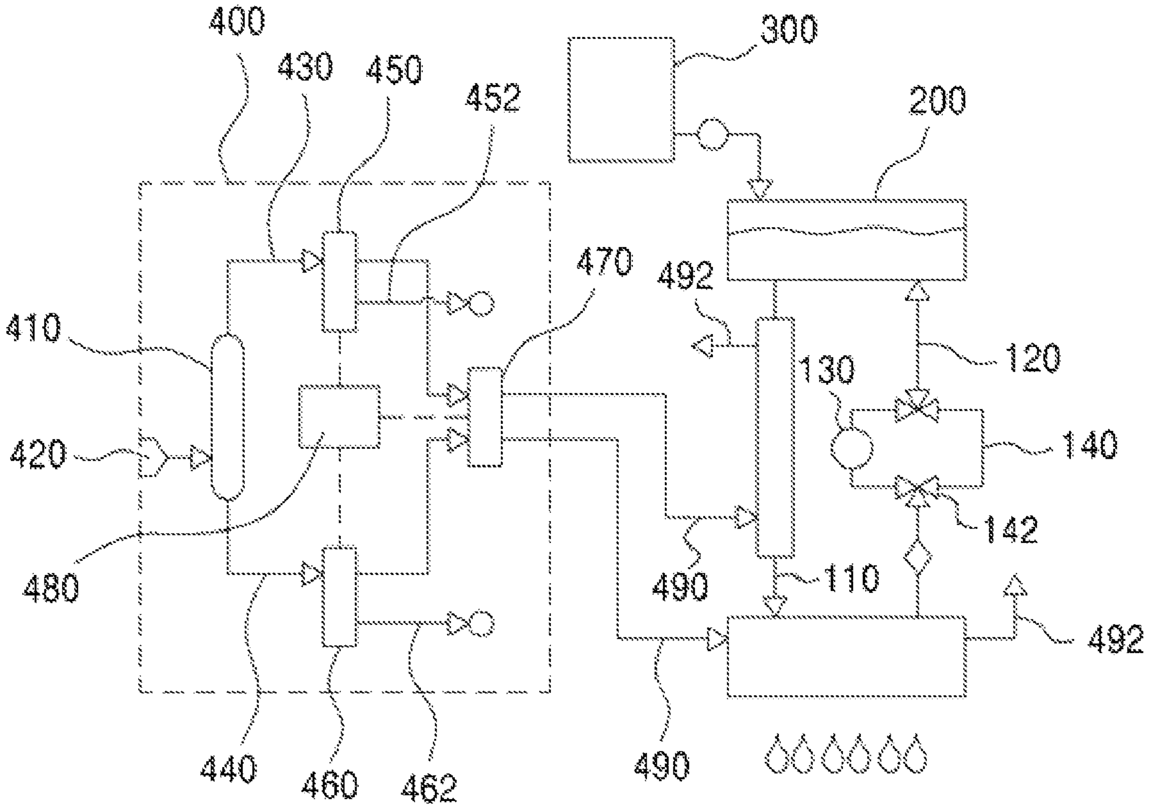
FIG. 3 is a schematic diagram showing the configuration of the inkjet printer according to a third embodiment of the present disclosure.

FIG. 3 is a schematic diagram showing the configuration of the inkjet printer according to a third embodiment of the present disclosure.

As shown in the drawing, the inkjet printer of the embodiment includes the inkjet head 100, the ink reservoir 200, the pressure control unit 300, and the ink temperature control unit 400, and descriptions equal to the second embodiment described above will be omitted.

The heat transfer medium supply line 490 is a gas line provided to supply the heat transfer medium of a gas form generated by mixing the low-temperature air current and the high-temperature air current in the mixing part 470 to a temperature control object. In the present disclosure, a final object with temperature controlled by the heat transfer medium is ink discharged from the nozzles. However, since it is difficult to directly control the temperature of the discharged ink, the inkjet printer of the embodiment supplies the heat transfer medium with the inkjet head 100 including the nozzles in which ink before discharging is located as the temperature-controlled object, and additionally, the inkjet printer supplies the heat transfer medium with the supply channel 110 as the temperature-controlled object.

When a difference between the temperature of ink stored in the ink reservoir 200 and a control target temperature is large, as described in the first embodiment, it may be difficult to control the temperature of ink only by supplying the heat transfer medium only to the inkjet head 100. In the embodiment, the inkjet printer is configured to supply the heat transfer medium to the supply channel 110 moved to the inkjet head 100 to control the temperature of ink supplied to the inkjet head 100 in advance. In this case, the temperature of ink is easily controlled in comparison to supplying the heat transfer medium only to the inkjet head 100.

The configuration in which the heat transfer medium supplied to the supply channel 110 controls the temperature of ink may be provided in the supply channel 110 Various structures that may perform heat exchange between the supply channel 110 and ink passing therethrough and the heat transfer medium may be applied without limitations. For example, a tube through which the heat transfer medium flows may be provided in pipes constituting the supply channel 110 or the periphery area of the supply channel 110, and the efficiency of heat exchange may differ in response to the length of the tube.

The heat transfer medium discharge line 492 may be provided to discharge the heat transfer medium supplied to the supply channel 110. Furthermore, a sensor is provided to measure the temperature of the supply channel 110, or ink passing therethrough, and the temperature of the heat transfer medium mixed in the mixing part 470 may be controlled on the basis of the measured temperature.

According to the embodiment, by using the heat transfer medium of the gas form with controlled temperature, the inkjet printer is configured to control the temperature of the supply channel 110 in addition to the inkjet head 100, i.e., a temperature-controlled object, so that the temperature control of ink is precisely performed and a problem that ink is discharged before the temperature thereof is sufficiently controlled may be prevented.

As the inkjet printer of the present disclosure uses the heat transfer medium of the gas form, a supply line is added and thus the temperature in various positions may be controlled.

Figure 4:
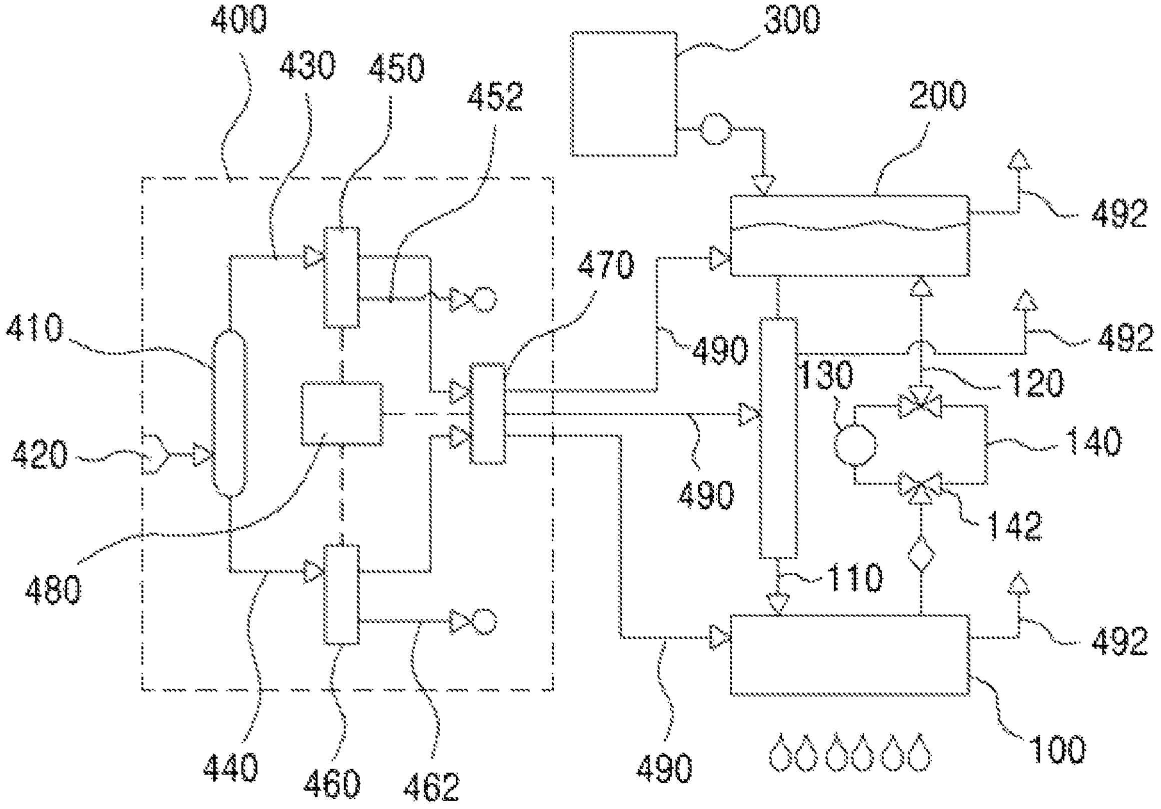
FIG. 4 is a schematic diagram showing the configuration of the inkjet printer according to a fourth embodiment of the present disclosure.

FIG. 4 is a schematic diagram showing the configuration of the inkjet printer according to a fourth embodiment of the present disclosure.

As shown in the drawing, the inkjet printer of the embodiment includes the inkjet head 100, the ink reservoir 200, the pressure control unit 300, and the ink temperature control unit 400, and descriptions equal to the embodiments described above will be omitted.

The heat transfer medium supply line 490 is a gas line provided to supply the heat transfer medium of a gas form generated by mixing the low-temperature air current and the high-temperature air current in the mixing part 470 to a temperature control object. In the present disclosure, a final object with temperature controlled by the heat transfer medium is ink discharged from the nozzles. However, since it is difficult to directly control the temperature of the discharged ink, the inkjet printer of the embodiment supplies the heat transfer medium with the inkjet head 100 including the nozzles in which ink before discharging is located as the temperature-controlled object, and additionally, the inkjet printer supplies the heat transfer medium with the ink reservoir 200 and the supply channel 110 as the temperature-controlled object.

The embodiment controls the temperature of the ink reservoir 200 and the supply channel 110 in addition to the inkjet head 100, i.e., a temperature-controlled object by using the heat transfer medium of the gas form with controlled temperature, so that the temperature control of ink is precisely performed and a problem that ink is discharged before the temperature thereof is sufficiently controlled may be prevented.

As the inkjet printer of the present disclosure use the heat transfer medium of the gas form, a supply line is added and thus the temperature in various positions may be controlled.

Figure 5:
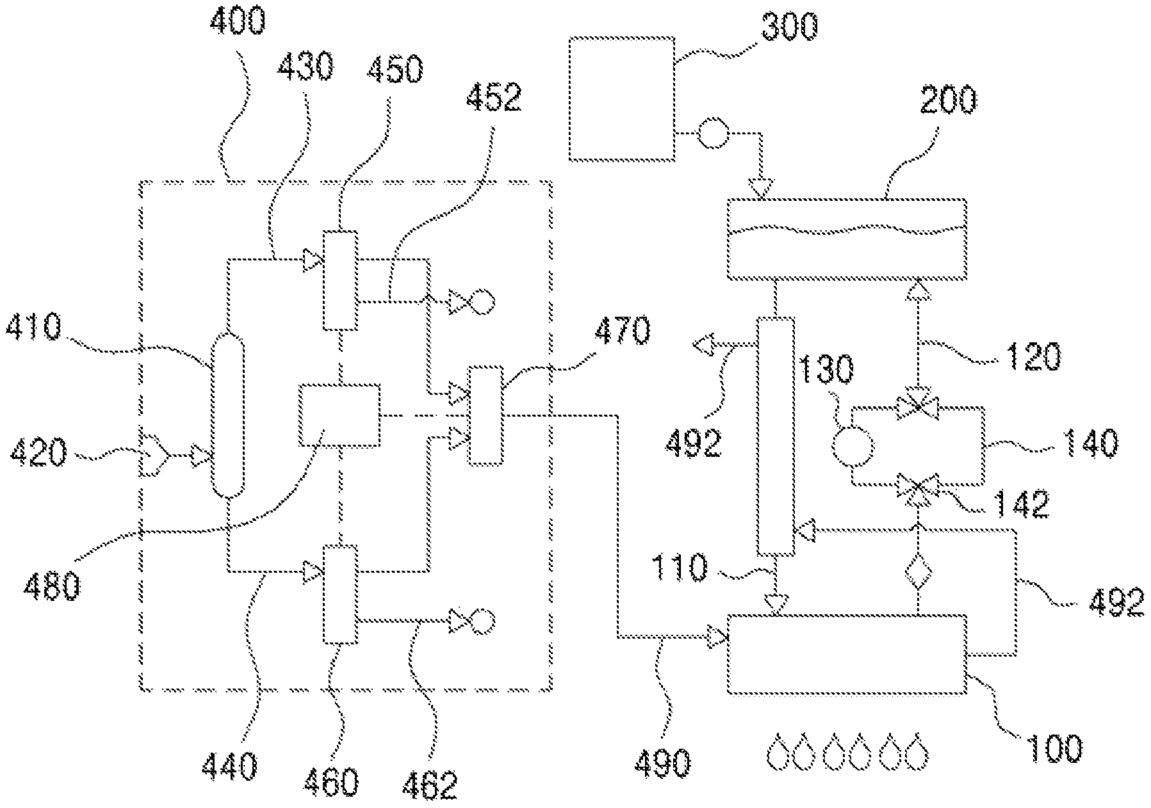
FIG. 5 is a schematic diagram showing the configuration of the inkjet printer according to a fifth embodiment of the present disclosure.

FIG. 5 is a schematic diagram showing the configuration of the inkjet printer according to a fifth embodiment of the present disclosure.

As shown in the drawing, the inkjet printer of the embodiment includes the inkjet head 100, the ink reservoir 200, the pressure control unit 300, and the ink temperature control unit 400, and descriptions equal to the embodiments described above will be omitted.

As described above, the ink reservoir 200 includes the heat transfer medium discharge line 492 discharging the supplied heat transfer medium. In the embodiment, the heat transfer medium discharge line 492 is extended so that the heat transfer medium is discharged through the supply channel 110. The heat transfer medium passing through the heat transfer medium discharge line 492 has the temperature decreased or increased compared to the target temperature while performing heat exchange in the inkjet head 100, i.e., the temperature-control object, and may serve to heat or cool ink supplied to the inkjet head 100 and passing through the supply channel 110 in advance.

The extended heat transfer medium discharge line 492 may have the configuration that may perform heat exchange with the supply channel 110. For example, a tube through which the heat transfer medium flows may be provided in pipes constituting the supply channel 110 or the periphery area thereof, and the efficiency of heat exchange may differ in response to the length of the tube.

Accordingly, the present disclosure may extend the heat transfer medium discharge line by using the heat transfer medium of the gas form, and as ink is heated or cooled by extending the heat transfer medium discharge line, the temperature control of ink may be precisely performed and a problem that ink is discharged before the temperature thereof is sufficiently controlled may be prevent.

Figure 6:
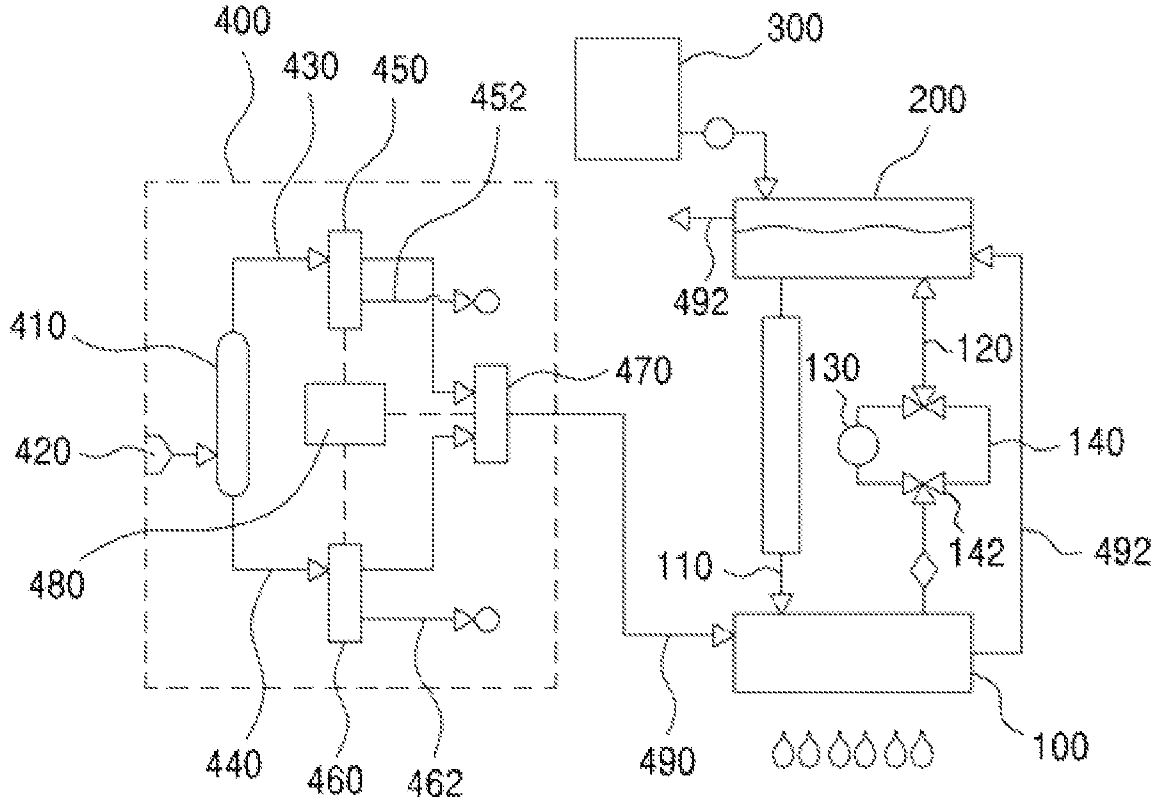
FIG. 6 is a schematic diagram showing the configuration of the inkjet printer according to a sixth embodiment of the present disclosure.

FIG. 6 is a schematic diagram showing the configuration of the inkjet printer according to a sixth embodiment of the present disclosure.

As shown in the drawing, the inkjet printer of the embodiment includes the inkjet head 100, the ink reservoir 200, the pressure control unit 300, and the ink temperature control unit 400, and descriptions equal to the embodiments described above will be omitted.

As described above, the ink reservoir 200 includes the heat transfer medium discharge line 492 discharging the supplied heat transfer medium. In the embodiment, the heat transfer medium discharge line 492 is extended so that the heat transfer medium is discharged through the ink reservoir 200. The heat transfer medium passing through the heat transfer medium discharge line 492 has the temperature decreased or increased compared to the target temperature while performing heat exchange in the inkjet head 100, i.e., the temperature-control object, and may serve to heat or cool ink stored in the ink reservoir 200 in advance.

The extended heat transfer medium discharge line 492 may have the configuration that may perform heat exchange with the ink reservoir 200. For example, a tube through which the heat transfer medium flows may be provided in walls constituting the ink reservoir 200 or the periphery area thereof, and the efficiency of heat exchange may differ in response to the length of the tube.

Accordingly, the present disclosure may extend the heat transfer medium discharge line by using the heat transfer medium of the gas form, and as ink is heated or cooled by extending the heat transfer medium discharge line, the temperature control of ink may be precisely performed and a problem that ink is discharged before the temperature thereof is sufficiently controlled may be prevent.

Figure 7:
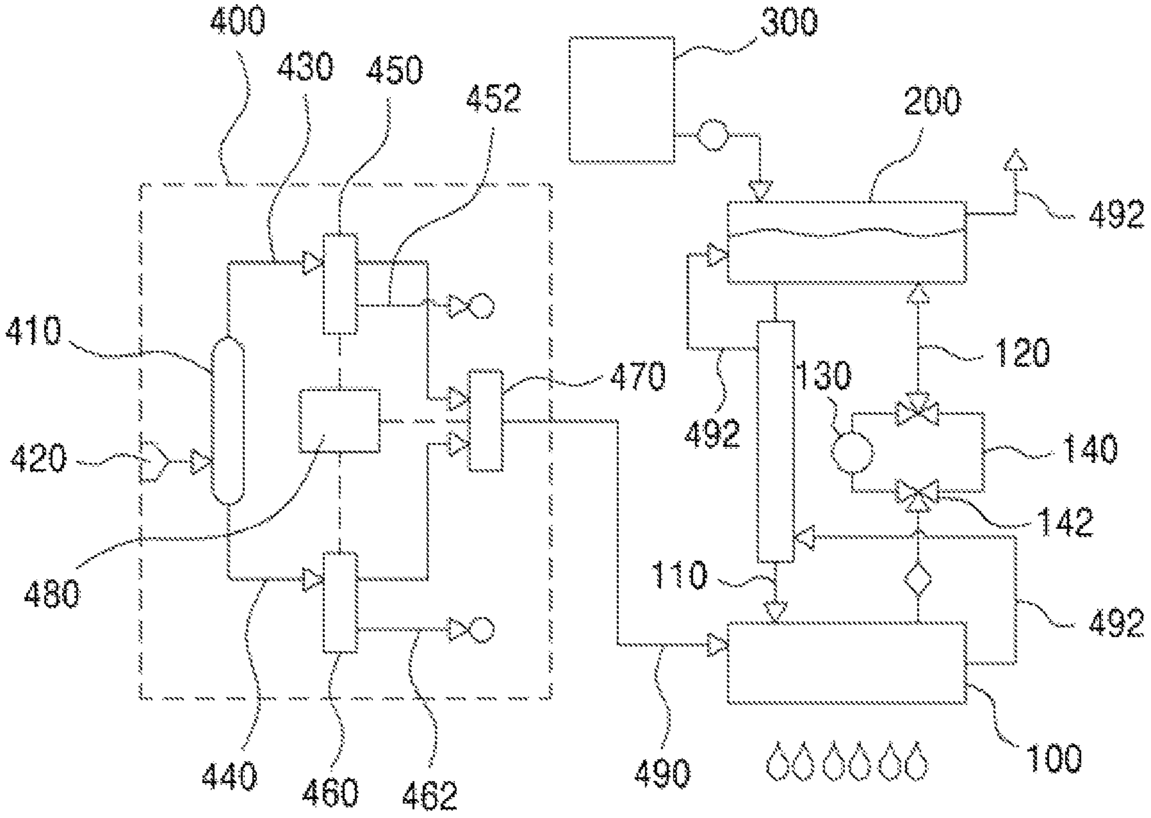
FIG. 7 is a schematic diagram showing the configuration of the inkjet printer according to a seventh embodiment of the present disclosure.
Figure 8:
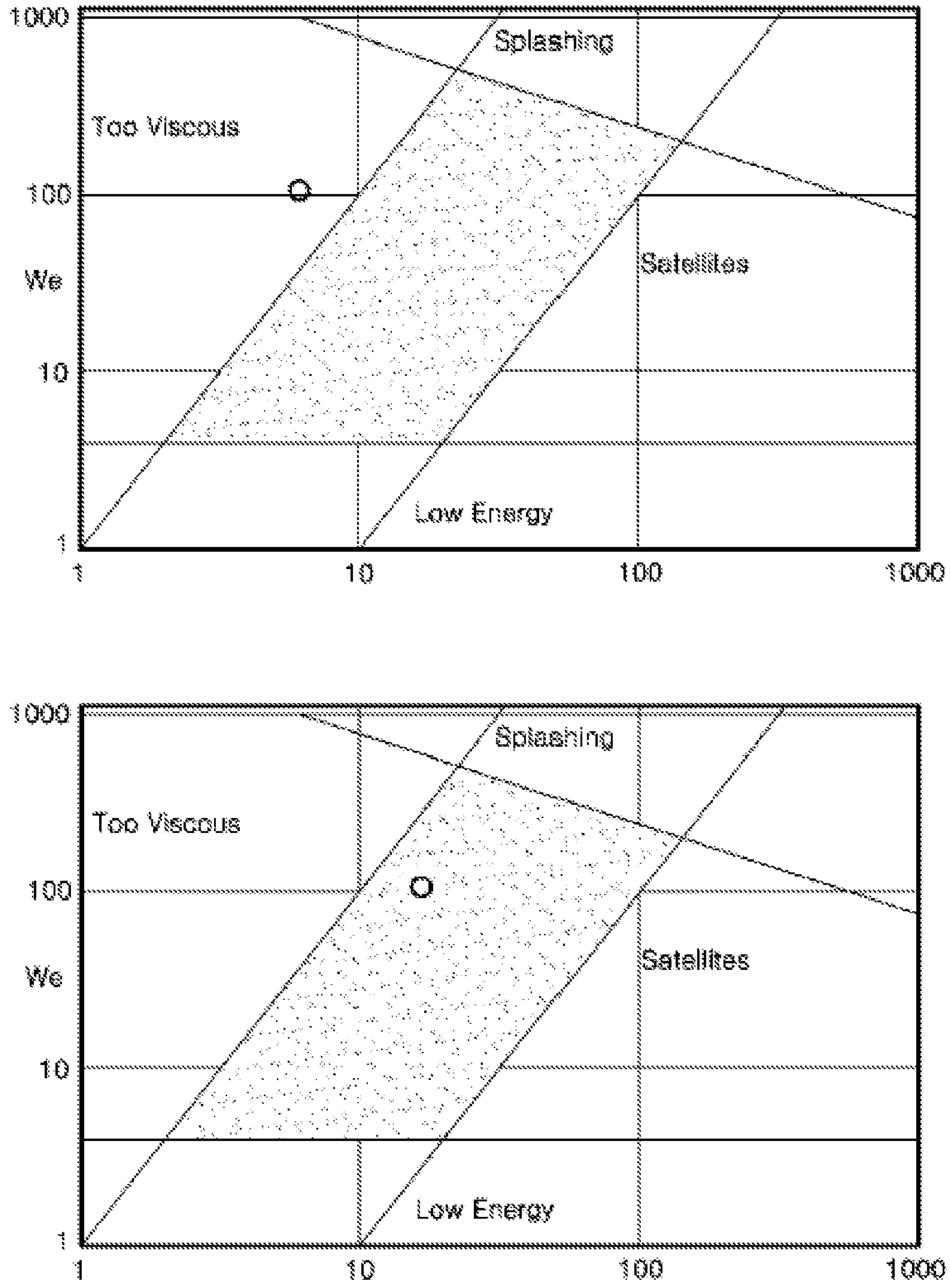
FIG. 8 is a diagram showing obtaining a liquid window applied to the inkjet printing by using Oh.
Figure 9:
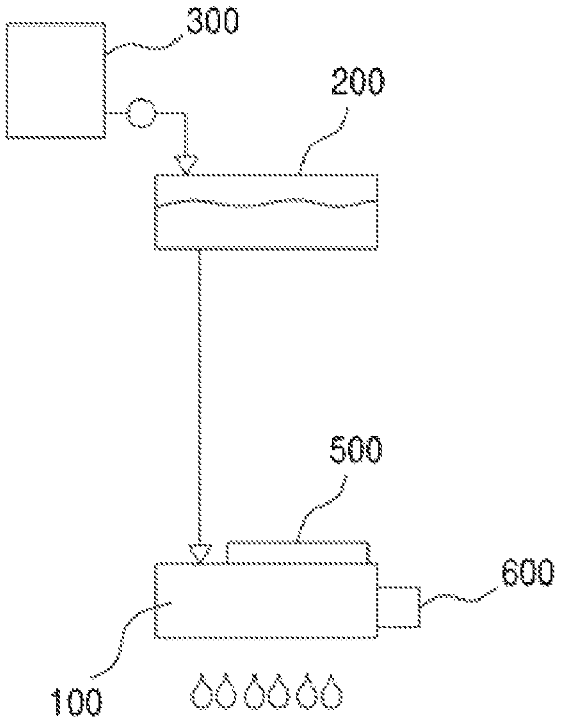
FIG. 9 is a view showing the configuration of a temperature control device of a head of a conventional inkjet printer.
Figure 10:
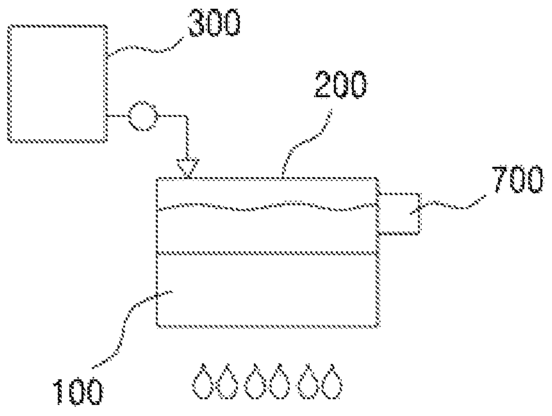
FIG. 10 is a view showing the configuration of a temperature control device configured to control the temperature of ink by using a thermo element.

FIG. 7 is a schematic diagram showing the configuration of the inkjet printer according to a seventh embodiment of the present disclosure.

As shown in the drawing, the inkjet printer of the embodiment includes the inkjet head 100, the ink reservoir 200, the pressure control unit 300, and the ink temperature control unit 400, and descriptions equal to the embodiments described above will be omitted.

As described above, the ink reservoir 200 includes the heat transfer medium discharge line 492 discharging the supplied heat transfer medium. In the embodiment, the heat transfer medium discharge line 492 is extended so that the heat transfer medium is discharged through the supply channel 110 and the ink reservoir 200. The heat transfer medium passing through the heat transfer medium discharge line 492 has the temperature decreased or increased compared to the target temperature while performing heat exchange in the inkjet head 100, i.e., the temperature-control object, and may serve to heat or cool ink passing through the supply channel 110 supplied to the inkjet head 100 and ink stored in the ink reservoir 200 in advance.

The extended heat transfer medium discharge line 492 may have the structure that may perform heat exchange with the supply channel 110 and the ink reservoir 200.

Accordingly, the present disclosure may extend the heat transfer medium discharge line by using the heat transfer medium of the gas form, and as ink is heated or cooled by extending the heat transfer medium discharge line, the temperature control of ink may be precisely performed and a problem that ink is discharged before the temperature thereof is sufficiently controlled may be prevent.

Although the preferred embodiments of the present invention have been disclosed in the detailed description with reference to with the accompanying drawings, it should be understood that the terminology used herein is for the purpose of describing particular embodiments only and is not intended to limit the meaning of elements or to limit the scope and sprit of the present disclosure. Accordingly, those skilled in the art will appreciate that various modifications, additions and substitutions are possible, without departing from the scope and spirit of the present disclosure as disclosed in the accompanying claims.

What is claimed is:

1. An inkjet printer comprising:

an inkjet head comprising a plurality of nozzles configured to discharge ink;

an ink reservoir configured to store ink supplied to the inkjet head;

a supply channel configured to supply the ink in the ink reservoir to the inkjet head;

a pressure control device connected to the ink reservoir through a pressure control tube and configured to maintain meniscus of the ink injected into the inkjet head; and an ink temperature control unit configured to control temperature of the ink discharged from the inkjet head, wherein the ink temperature control unit comprises a vortex tube configured to be supplied with compressed air and discharge a low-temperature air current and a high-temperature air current, a mixing part configured to mix the low-temperature air current and the high-temperature air current that are discharged from the vortex tube and to generate a heat transfer medium, a controller configured to adjust a ratio of the low-temperature air current to the high-temperature air current that are mixed in the mixing part and to control temperature of the heat transfer medium, and a heat transfer medium supply line configured to supply the heat transfer medium generated in the mixing part to the inkjet head, and the heat transfer medium supplied to the inkjet head through the heat transfer medium supply line is configured to change the temperature of the ink discharged from the inkjet head by a heat exchange structure.

2. The inkjet printer of claim 1, further comprising:

a low-temperature air current adjustment part configured to adjust flowing amount of the low-temperature air current discharged from the vortex tube into the mixing part, and a high-temperature air current adjustment part configured to adjust flowing amount of the high-temperature air current discharged from the vortex tube into the mixing part, wherein the controller is configured to control both the low-temperature air current adjustment part and the high-temperature air current adjustment part to adjust the temperature of the heat transfer medium.

3. The inkjet printer of claim 2, wherein the low-temperature air current adjustment part is a three way valve that is installed at a low-temperature air current line through which the low-temperature air current flows and is connected to a low-temperature air current discharge line, the high-temperature air current adjustment part is a three way valve installed at a high-temperature air current line through which the high-temperature air current flows and is connected to a high-temperature air current discharge line, and the controller is configured to adjust opening amount of the three way valve to adjust amount of the low-temperature air current flowing into the mixing part and amount of the high-temperature air current flowing into the mixing part.

4. The inkjet printer of claim 2, wherein the mixing part comprises a temperature sensor configured to measure the temperature of the heat transfer medium, and based on the temperature measured by the temperature sensor installed at the mixing part, the controller is configured to control the low-temperature air current adjustment part and the high-temperature air current adjustment part.

5. The inkjet printer of claim 1, wherein a temperature sensor is provided at the inkjet head to measure temperature, and the controller is configured to control the temperature of the heat transfer medium based on the temperature measure by the temperature sensor provided at the inkjet head.

6. The inkjet printer of claim 1, the inkjet head comprises a head block in which the nozzles are provided, and the heat transfer medium flows through a tube provided in the head block, so that heat exchange is performed.

7. The inkjet printer of claim 1, further comprising:

a heat transfer medium supply line configured to supply the heat transfer medium generated in the mixing part to the ink reservoir, wherein the heat transfer medium supplied to the ink reservoir through the heat transfer medium supply line is configured to change the temperature of the ink stored in the ink reservoir by a heat exchange structure.

8. The inkjet printer of claim 1, further comprising:

a heat transfer medium supply line configured to supply the heat transfer medium generated in the mixing part to the supply channel, wherein the heat transfer medium supplied to the supply channel through the heat transfer medium supply line is configured to change the temperature of ink passing through the supply channel by a heat exchange structure.

9. The inkjet printer of claim 1, further comprising:

a heat transfer medium discharge line configured to discharge the heat transfer medium supplied to the heat exchange structure of the inkjet head, wherein the heat transfer medium discharge line is extended to pass through a heat exchange structure for the supply channel, so that the heat transfer medium passing through the heat transfer medium discharge line exchanges heat with ink passing through the supply channel.

10. The inkjet printer of claim 1, further comprising:

a heat transfer medium discharge line configured to discharge the heat transfer medium supplied to the heat exchange structure of the inkjet head, wherein the heat transfer medium discharge line is extended to pass through a heat exchange structure for the ink reservoir, so that the heat transfer medium passing through the heat transfer medium discharge line exchanges heat with the ink stored in the ink reservoir.

* * * * *